United States Patent [19]

Kuhl et al.

[11] Patent Number: 4,604,119

[45] Date of Patent: Aug. 5, 1986

[54] METHOD FOR FUSION SPLICING OPTICAL FIBER

[75] Inventors: Jane F. Kuhl, Atlanta; William A. Vicory, Duluth, both of Ga.

[73] Assignee: AT&T Bell Laboratories, Murray Hill, N.J.

[21] Appl. No.: 573,142

[22] Filed: Jan. 24, 1984

[51] Int. Cl.$^4$ .............................................. C03B 23/20
[52] U.S. Cl. ........................................ 65/4.21; 65/4.2
[58] Field of Search .................................. 65/4.2, 4.21; 350/96.21, 96.15

[56] References Cited

U.S. PATENT DOCUMENTS

| | | | |
|---|---|---|---|
| 3,791,714 | 2/1974 | Maurer | 65/3.12 X |
| 4,118,618 | 10/1978 | Gauthier et al. | 65/4.21 |
| 4,326,870 | 4/1982 | Bendit et al. | 65/4.21 |
| 4,372,768 | 2/1983 | Zucker et al. | 65/4.21 |
| 4,389,230 | 6/1983 | Modone et al. | 65/3.12 |

FOREIGN PATENT DOCUMENTS 57-92533  6/1982  Japan ..................................... 65/4.21

OTHER PUBLICATIONS

Dainichi; Nippon Cables Rev. (Japan) No. 67 (Apr. 1981); pp. 61–66.
"Tensile Strengths>4 GPa for Lightguide Fusion Splices" by J. T. Krause et al., *Electronics Letters,* vol. 17, No. 21, Oct. 15, 1981, pp. 812–813.

*Primary Examiner*—Kenneth M. Schor
*Attorney, Agent, or Firm*—Eugen E. Pacher

[57] ABSTRACT

High-strength, low-loss splices of optical fiber can be produced by fusion splicing the fiber with a $D_2$-$O_2$ flame. According to the invention, the deuterium concentration in the gas mixture used to produce the flame is at least 10% by volume of the reducing gas present in the mixture. Preferably, substantially all of the reducing gas in the mixture is deuterium, with oxygen the oxidizing gas species.

7 Claims, 3 Drawing Figures

METHOD FOR FUSION SPLICING OPTICAL FIBER

FIELD OF THE INVENTION

This invention pertains to the field of fusion splicing of optical fiber.

BACKGROUND OF THE INVENTION

Communications systems comprising optical fiber links are being installed at a rapidly increasing rate, and it is expected that optical fiber will become the transmission medium of choice in many applications. One of these applications is expected to be undersea cable for voice and data transmission.

Optical fiber is now routinely being produced with losses less than 1 dB/km at wavelengths in the near-infrared, e.g., at 1.3 μm or 1.55 μm, wavelengths that are currently frequently considered for long-haul transmission links. In the laboratory fiber has been produced that has much lower loss still, of the order of 0.2 dB/km, and it can be expected that production fiber will approach such low loss values in the future.

Optical fiber is typically produced by drawing from a glass body, generally referred to as a preform. The preform is produced to have an appropriately radially shaped refractive index profile, and the profile is transferred to the fiber. Typically more than 10 kilometers of fiber can be drawn from a single preform, but the length of cabled fiber typically is at most a few kilometers. Since repeater spacings substantially in excess of the length of single pieces of cable are possible, it is obviously necessary to join one or more cable lengths to complete a fiber span, i.e., a unit of the fiber transmission system. Fiber often also is proof tested prior to cabling, and such tests can result in breakage of fiber at weak points in the fiber, necessitating joining of fiber segments. From the above remarks it is evident that it is necessary to have available methods for joining together pieces of optical fibers.

Prominent among the currently used methods for joining fibers is the fusion method. See, for instance, J. P. Krause et al, *Electronics Letters*, Vol. 17(21), pp. 812-813, 1981. In fusion splicing, the fiber ends, after aligning the cores to minimize signal loss, are heated by means of a microtorch and caused to fuse. Such splices can be prepared routinely having losses less than 0.1 dB, and relatively high strength.

It has been found that splices of especially high strength, of the order of 4 GPa (about 580 kpsi) or more, can be produced with a $H_2$-$Cl_2$ flame, but splices produced with the aid of a $H_2$-$O_2$ flame are found to typically have considerably lower tensile strength.

Despite the excellent results achieved with the $H_2$-$Cl_2$ flame, the method has considerable disadvantages. Chief among these is the toxicity of chlorine. Due to this toxicity, special precautions are required whenever a chlorine-hydrogen torch is to be used. For the same reason, chlorine transport, storage, and disposal are cumbersome and expensive. These and other considerations militate against use of $H_2$-$Cl_2$ flame fusion on the factory floor and, even more so, against its use on board of submarine-cable-laying ships.

In light of the above, it is clear that a method for fusion-splicing optical fiber that yields high-strength, low-loss splices, that does not involve highly dangerous or toxic substances, and that is relatively inexpensive, would be of great commercial interest. This application discloses such a method.

SUMMARY OF THE INVENTION

We have discovered that deuterium can advantageously be used in flame fusion splicing of optical fiber, typically silica-based optical fiber. Such use can result in higher strength splices, as compared to splices produced by means of a $H_2$-$O_2$ flame. The flame used in fusion splicing according to the invention results from the combustion of a gas mixture comprising at least one oxidizing gas species and at least one reducing gas species, with the deuterium concentration in the mixture being at least 10% by volume of the total amount of reducing gas present in the mixture.

DETAILED DESCRIPTION

Figure 3:
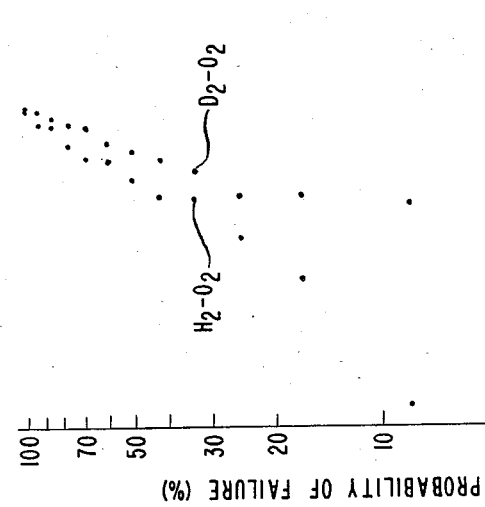
FIG. 3 gives the Weibull distribution of failure probability for both sets of splices.

Flame fusion methods of optical fiber splicing comprise heating of the ends of two optical fibers by means of a flame (or flames). The flame results from the burning of a gas mixture, typically produced by mixing of two or more gases in a torch, the mixture streaming from one or more orifices in the torch. The gases typically are supplied to the torch by means of tubing connected to gas bottles. Such installations are familiar to those skilled in the art and require no detailed description. A torch design that is useful in the practice of the invention is disclosed in U.S. patent application Ser. No. 573,141, filed concurrently and co-assigned with this.

Gas mixtures used in flame fusion splicing typically comprise at least one oxidizing gas species, e.g., oxygen, or chlorine, and at least one reducing gas species, e.g., hydrogen. We have found that use of deuterium as one of the reducing species, preferably as substantially the only reducing gas, in the gas mixture, has advantageous results. For instance, in silica-based fiber we found that splices produced by the inventive method on average typically are stronger than splices made with a $H_2$-$O_2$ flame. For a given required minimum strength of splices the inventive method thus can result in a higher yield of acceptable fiber than the prior art $H_2$-$O_2$ flame fusion method.

Since the advantageous effect of deuterium decreases with decreasing $D_2$ concentration in the flame, we believe that the deuterium fraction of the reducing gas present in the inventive gas mixture should be at least about 10% by volume of the reducing gas, preferably at least about 50% by volume of the reducing gas. More preferably still is the use of reducing gas consisting substantially of deuterium. For instance, the splices according to the invention that are described in the Example below were made with a $D_2$-$O_2$ flame, the deuterium being commercial grade, of about 99% purity.

Deuterium has the same chemical properties as hydrogen, and thus can directly and without change in procedure be used together with, or substituted for, hydrogen in a flame fusion splice apparatus. No safety precautions in excess of those required for hydrogen are necessary. The quantity of deuterium necessary for making a splice is small, typically of the order of 1 liter. The materials cost per splice is thus relatively small.

Typically, end-to-end fusion splicing by the inventive method of a first silica-based single mode optical fiber to a second silica-based single mode optical fiber comprises: (a) coupling electromagnetic radiation into the first optical fiber, at least part of the coupled-in radiation being guided to a first end of the first optical fiber, and being radiated therefrom; (b) coupling at least part of the radiation radiated from the first end of the first optical fiber into a first end of the second optical fiber; (c) aligning the fibers to substantially maximize the amount of radiation coupled into the first end of the second optical fiber; (d) heating the first end of the first and of the second optical fibers, respectively, to a fusion temperature by exposing the first ends to a flame produced by combustion of a gas mixture comprising oxidizing gas (typically $O_2$) by reducing gas, with at least 10% by volume of the total amount of reducing gas in the mixture being deuterium; and (e) fusing the fiber ends.

EXAMPLE

The splices described herein were prepared on a portable flame fusion splicer comprising a left and a right micropositioning assembly, a torch assembly, a mini-stereo-microscope, and two flow meters, all mounted on a base unit, together with such conventional components as valves, flow meters, etc., which will not be described herein. The micropositioners were commercial units, magnets were used to hold the fibers in place, the torch was made of glass and was mounted atop another commercial micropositioner. Measured amounts of $D_2$ and $O_2$ were provided to the torch via the flow meters. The splicer was located in a laminar flow hood to provide a clean air environment.

The fiber used was polymer-coated single mode silica-based fiber that had been proof tested to 200 kpsi (1.38 GPa). The polymer coat was stripped from the fiber ends by a one minute soak in $H_2SO_4$ at 200° C., followed by a 30 second rinse in $H_2$-$O_2$ at room temperature and a ten second rinse in acetone. The stripped fiber ends were cleaved, and the thus prepared ends placed into chucks mounted on the micropositioners of the splicer. A laser was coupled to the remote end of one fiber piece, and a detector to the remote end of the other fiber piece. The x, y, and z micropositioners were adjusted until maximum detector output was obtained. The gas flows were adjusted ($D_2$ flow rate 945 ml/min, $O_2$ flow rate 50 ml/min), the torch lit, the flame moved toward the abutting prepared fiber ends and the ends fused. After removing the spliced fiber from the chucks the splice was tensile tested at a strain rate of 0.2 $min^{-1}$.

Twelve splices were prepared with a $D_2$-$O_2$ flame according to the invention. Their tensile test results are listed in the table below, and compared with the test results of 12 identically prepared prior art $H_2$-$O_2$ flame ($H_2$ flow rate 345 ml/min, $O_2$ flow rate 50 ml/min) fusion splices.

| TENSILE TEST RESULTS | | |
| --- | --- | --- |
| | $D_2$—$O_2$ | $H_2$—$O_2$ |
| Number of Splices | 12 | 12 |
| Mean Strength | 411 kpsi | 340 kpsi |
| Standard Deviation | 84 kpsi | 128 kpsi |
| Median Strength | 412 kpsi | 357 kpsi |
| Yield over 300 kpsi | 92% | 67% |

Figure 1:
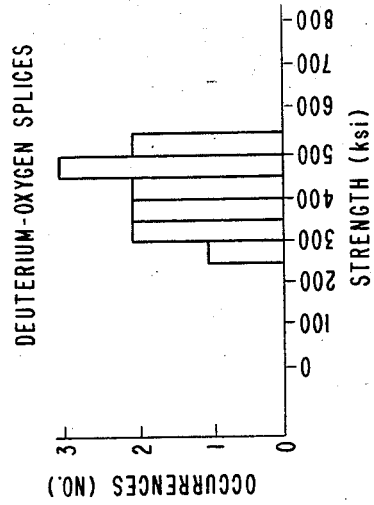
FIG. 1 shows the results of tensile testing splices according to the invention.
Figure 2:
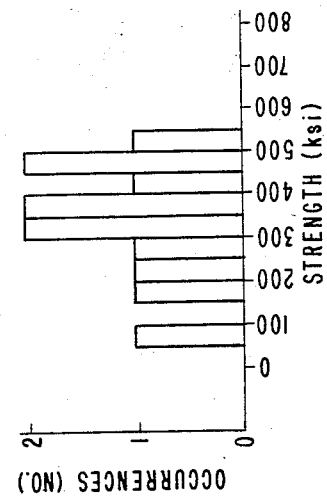
FIG. 2 similarly shows the results of tensile testing prior art $H_2$-$O_2$ splices.

The test results are further depicted in FIGS. 1–3. FIG. 1 shows the test results for the 12 $D_2$-$O_2$ splices, and FIG. 2, for the 12 $H_2$-$O_2$ splices. FIG. 3 shows the Weibull distribution for both sets of splices. The Figures clearly demonstrate the superior strength properties of splices according to the invention over prior art $H_2$-$O_2$ splices. The loss distributions of both sets of splices are essentially identical, with a mean of about 0.12 dB.

What is claimed is:

1. Method for producing a composite optical fiber by end-to-end fusing a first optical fiber to a second optical fiber, the method comprising
   (a) aligning an end of the first optical fiber with an end of the second optical fiber,
   (b) heating the aligned fiber ends to a fusion temperature by exposing the aligned fiber ends to a flame produced by combustion of a gas mixture comprising at least one species of oxidizing gas and at least one species of reducing gas, with at least 10% by volume of the total amount of reducing gas present in the mixture being deuterium, and
   (c) fusing the aligned fiber ends.

2. Method of claim 1, wherein the oxidizing gas in the mixture consists substantially of oxygen.

3. Method of claim 2, wherein the reducing gas in the mixture consists substantially of deuterium.

4. Method of claim 1, wherein the first optical fiber and the second optical fiber are silica-based optical fibers.

5. Method of claim 4, wherein the optical fibers are single mode optical fibers.

6. Method for producing a composite optical fiber by end-to-end fusion splicing a first silica-based single mode optical fiber to a second silica-based single mode optical fiber, the method comprising
   (a) coupling electromagnetic radiation into the first optical fiber, at least part of the coupled-in radiation being guided to a first end of the first optical fiber and being radiated from the first end of the first optical fiber,
   (b) coupling at least part of the radiation radiated from the first end of the first optical fiber into a first end of the second optical fiber,
   (c) adjusting the position of at least one of said optical fibers to substantially maximize the amount of radiation coupled into the first end of the second optical fiber,
   (d) heating the first end of the first optical fiber and the first end of the second optical fiber by exposing the first ends of the first and second optical fibers, respectively, to a flame produced by combustion of a gas mixture comprising oxygen and at least one reducing gas species, with at least 10% by volume of the total amount of reducing gas present in the mixture being deuterium, and
   (e) fusing the first end of the first optical fiber to the first end of the second optical fiber.

7. Method of claim 6, wherein the reducing gas in the mixture consists substantially of deuterium.

* * * * *